United States Patent [19]

Zaitsu et al.

[11] 4,223,361
[45] Sep. 16, 1980

[54] MAGNETIC RECORDING MEDIUM

[75] Inventors: Hiroshi Zaitsu; Takashi Yamase, both of Takatsuki; Sadao Yamashita, Kyoto; Kunio Mizushima, Takatsuki, all of Japan

[73] Assignee: Hitachi Maxell, Ltd., Osaka, Japan

[21] Appl. No.: 961,279

[22] Filed: Nov. 16, 1978

[30] Foreign Application Priority Data

Nov. 16, 1977 [JP] Japan .............................. 52-138222
Nov. 16, 1977 [JP] Japan .............................. 52-138223
Nov. 19, 1977 [JP] Japan .............................. 52-139131

[51] Int. Cl.$^2$ ........................ H01F 10/02; G11B 5/62
[52] U.S. Cl. .................................. 360/133; 428/900; 252/62.54
[58] Field of Search .............................. 360/132–135; 428/900, 329; 252/62.54

[56] References Cited

U.S. PATENT DOCUMENTS

| 3,919,719 | 11/1975 | Wright et al. ........................ 360/134 |
| 3,993,824 | 11/1976 | Shirahata et al. ................. 428/900 X |
| 4,005,242 | 1/1977 | Kopke et al. ..................... 428/900 X |
| 4,110,503 | 8/1978 | Ogawa et al. .................... 428/900 X |

*Primary Examiner*—John H. Wolff
*Attorney, Agent, or Firm*—Birch, Stewart, Kolasch & Birch

[57] ABSTRACT

A magnetic recording medium improved in durability which comprises a substrate and a magnetic layer of about 1.0 to 10$\mu$ in thickness comprising magnetic particles and a binder and being formed on the substrate, characterized in that the magnetic layer further comprises (a) a liquid hydrocarbon having a melting or flowing point of about $-20°$ to $-60°$ C. with (b) $\alpha$-iron oxide particles having a particle size of 0.5 to 2$\mu$ and/or (c) a higher fatty acid having a melting point of about 45° C. or higher.

13 Claims, 2 Drawing Figures

MAGNETIC RECORDING MEDIUM

BACKGROUND OF THE INVENTION

The present invention relates to a magnetic recording medium improved in durability, particularly for a magnetic disk cartridge.

In magnetic recording media such as magnetic disks, magnetic tapes and magnetic sheets, the magnetic layer is apt to be worn away due to its contact with a magnetic head under a large velocity at recording and reproducing. Thus, development of a magnetic recording medium excellent in wear-resistance and durability has been highly desired.

For this purpose, it has already been proposed to incorporate into the magnetic layer non-magnetic particles such as $\alpha$-iron oxide particles or lubricating agents such as higher fatty acids, higher alcohols and silicone oils. The incorporation of such non-magnetic particles or lubricating agents can improve the durability, but a sufficiently satisfying effect is not obtained. In the case of incorporating $\alpha$-iron oxide particles, for instance, the coating film becomes hard and the magnetic head is liable to be worn away. Such a problem is particularly notable in a magnetic disk cartridge comprising a jacket and a magnetic disk contained therein in a state permitting its free rotation. When $\alpha$-iron oxide particles are incorporated, the coating film becomes so hard that the magnetic head or the liner comprising, for instance, non-woven cloth and placed between the jacket and the body of the magnetic disk is readily worn out. In case of incorporating a lubricating agent such as liquid paraffin into the magnetic layer, on the other hand, the wear of the magnetic layer by the magnetic head is prevented, but the contact of the magnetic layer with the said liner causes the wear of the former, and powders dropped off from the magnetic layer adhere to the magnetic layer, which becomes one of the causes for occurrence of drop out or other troubles.

SUMMARY OF THE INVENTION

As the result of the extensive study under these circumstances, it has now been found that the use of $\alpha$-iron oxide ($\alpha$-Fe$_2$O$_3$) particles in combination with a liquid hydrocarbon not only prevents the wear of the magnetic head but also improves the wear-resistance still more. It has also been found that the use of a liquid hydrocarbon, particularly liquid paraffin, and a higher fatty acid in combination can attain the same prevention and improvement as stated above. It has further been found that the combined use of $\alpha$-iron oxide particles with a liquid hydrocarbon, especially liquid paraffin, and a higher fatty acid prevents not only the wear of the magnetic head but also that of the magnetic layer by the magnetic head and the liner, and the wear-resistance can be thus improved satisfactorily.

Accordingly, a main object of the present invention is to provide a magnetic recording medium improved in durability without damaging a magnetic head. Another object of this invention is to provide a magnetic recording medium excellent in durability in which occurrence of drop out is prevented. A further object of the invention is to provide a magnetic disk cartridge in which the liner comprising, for instance, non-woven cloth is hardly damaged and the wear of the magnetic layer by the said liner is also prevented.

DETAILED DESCRIPTION OF THE INVENTION

The magnetic recording medium of the present invention comprises a substrate and a magnetic layer of about 1.0 to 10$\mu$ in thickness comprising magnetic particles and a binder being formed on the substrate and is characterized in that the magnetic layer further comprises (a) a liquid hydrocarbon having a melting or flowing point of about $-20°$ to $-60°$ C. with (b) $\alpha$-iron oxide particles having a particle size of 0.5 to 2$\mu$ and/or (c) a higher fatty acid having a melting point of about 45° C. or higher.

The $\alpha$-iron oxide particles to be used in the present invention are desired to be in a granular form rather than an acicular form. A particularly excellent effect can be obtained when the $\alpha$-iron oxide particles have an average single particle size of about 0.5 to 2$\mu$. In case of the average single particle size of the $\alpha$-iron oxide particles being less than about 0.5$\mu$, improvement of the durability is hardly attained. With the increase of the particle size, the durability becomes more improved, but the lubricity of the surface of the magnetic layer becomes apt to be lost. When the thickness of the magnetic layer is designed to be about 1.0 to 10$\mu$, therefore, it is favorable to select the $\alpha$-iron oxide particles having a particle size of about 2$\mu$ or less.

The amount of the $\alpha$-iron oxide particles to be added is favorably from about 0.5 to 5% by weight to the magnetic particles in the magnetic layer. In case of the amount being larger than about 5% by weight, the output response tends to be decreased, and the wear of the magnetic head is readily caused. A particularly desirable effect can be obtained when the amount is about 1 to 3% by weight.

The use of the $\alpha$-iron oxide particles in an acicular form affords an effect inferior to that obtained by the use of granular $\alpha$-iron oxide particles. The distinction between the acicular form and the granular form is based on the ratio of the lengths of the long axis and the short axis. In case of the ratio being 2/1 or larger, the particles are regarded as acicular, and in case of the ratio being smaller than 2/1, they are regarded as granules.

The liquid hydrocarbon is desired to be in a liquid form at normal temperature and to have a melting point of 0° C. or lower. For example, liquid paraffin, squalane, synthetic squalane and $\alpha$-olefin polymerized oils are employable. Among them, liquid paraffin is particularly preferable. Liquid paraffin is a colorless, odorless hydrocarbon mainly comprising alkylnaphthalenes. It shows a low volatility and is present in a liquid state at normal temperature, having a melting point of 0° C. or lower.

The liquid hydrocarbon is favorably used in an amount of about 0.5 part by weight or more to one part by weight of the $\alpha$-iron oxide particles in the magnetic layer. With the increase of the amount of the liquid hydrocarbon, the durability becomes more improved. But, the use of a too large amount of the liquid hydrocarbon is undesirable, because an excessive amount of the liquid hydrocarbon exudes to the surface to contaminate the magnetic head. It is thus favored to limit the amount to about 50 parts by weight or less.

When the liquid hydrocarbon, particularly liquid paraffin, is admixed with the higher fatty acid having a melting point of 45° C. or higher and incorporated into the magnetic layer, a remarkable lubrication-maintaining effect is exerted to improve the wear-resistance markedly. The mechanism of this effect is not yet clarified sufficiently. It is supposed that, when the liquid hydrocarbon and the higher fatty acid are incorporated into the magnetic layer, the higher fatty acid adheres moderately to the magnetic head comprising a metal or its oxide at the contact between the magnetic layer and the magnetic head as the carboxyl groups in the higher fatty acid have an affinity to metals or metal oxides, and the higher fatty acid thus adhering to the magnetic head and the liquid hydrocarbon produce a synergistic effect due to their miscibility to exhibit an excellent lubricating activity.

The liquid hydrocarbon, particularly liquid paraffin, and the higher fatty acid are mixed together in a solvent such as n-hexane to make a solution, from which the solvent is removed so as to obtain a crystalline product having a viscosity in which the liquid hydrocarbon is held in the higher fatty acid. When the thus obtained product is incorporated into the magnetic layer, not only the wear by the magnetic head but also that by the liner can be prevented and the use of the magnetic layer for a long duration of time with an excellent durability becomes possible. In addition, the wear of the magnetic head and the liner can be also prevented sufficiently. The formation of the said product having a crystalline structure is realized by admixing the liquid hydrocarbon and the higher fatty acid in a weight proportion of about 99.5:0.5 to 70:30. With the increase of the amount of the higher fatty acid, the ability of holding the liquid hydrocarbon is enhanced to decrease the wear of the magnetic layer by the liner, but the occurrence of bleed out tends to be increased. Thus, the amount of the higher fatty acid is desired to be in the above mentioned range.

The higher fatty acid is preferred to have a melting point of 45° C. or higher. When the melting point is lower, the acid is apt to be volatilized during storage to decrease the lubrication-maintaining ability. Examples of such higher fatty acids are myristic acid, palmitic acid and stearic acid. The amounts of the liquid hydrocarbon and the higher fatty acid to be incorporated into the magnetic layer are such that the ratio of the sum of their amounts to the amount of the $\alpha$-iron oxide particles becomes about 0.5 or more by weight. With the increase of their amounts, the durability becomes more improved. But too large amounts are undesirable, because excess amounts of them exude to the surface to contaminate the magnetic head. Thus, the said ratio should be limited to 50 or less.

The magnetic particles to be used in the invention are desired to have a particle size of 1$\mu$ or less, preferably of 0.1 to 1$\mu$, and an axis ratio (long axis/short axis) of 2 or more, preferably of 5 to 15, for obtaining an excellent magnetic recording medium. Examples of such magnetic particles are ferro-magnetic iron oxide particles such as $\gamma$-Fe$_2$O$_3$ particles and Fe$_3$O$_4$ particles and their magnetically modified products obtained by introduction of metal atoms such as cobalt atom, chromium dioxide particles and strongly magnetic metal particles such as iron, cobalt and nickel. The use of the ferro-magnetic oxide particles is particularly preferable because of their affinity to the liquid hydrocarbon and/or the higher fatty acid.

As the binder to be admixed with the magnetic particles, vinyl chloride copolymer, polyvinyl butyral, polyurethane resin, cellulose resin, vinylidene chloride copolymer, rubber resin, etc. may be employed advantageously. By the use of vinyl chloride-vinyl acetate copolymer, a particularly excellent effect can be obtained owing to its affinity to the $\alpha$-iron oxide powders, the liquid hydrocarbon and the higher fatty acid. The mixing proportion of the magnetic particles and the binder is usually desired to be from about 50:50 to 90:10 by weight.

The formation of the magnetic layer comprising the liquid hydrocarbon with the $\alpha$-iron oxide particles and/or the higher fatty acid in addition to the magnetic particles and the binder may be carried out by a per se conventional procedure. For instance, the $\alpha$-iron oxide particles are mixed with the magnetic particles and the binder in a solvent, the resulting mixture is applied onto a substrate material to form a magnetic layer and a mixture of the liquid hydrocarbon and the higher fatty acid optionally diluted with a solvent such as n-hexane is applied onto the magnetic layer. Alternatively, the substrate material having thereon the magnetic layer formed as above may be immersed in a solution of the liquid hydrocarbon and the higher fatty acid in a solvent. Further, the liquid paraffin and the higher fatty acid may be mixed with the $\alpha$-iron oxide particles, together with the magnetic particles and the binder, followed by application of the resulting mixture onto a substrate material to make a magnetic layer.

PREFERRED EMBODIMENTS

Practical and presently preferred embodiments of the invention are illustratively shown in the following Examples wherein part(s) are by weight unless otherwise indicated.

EXAMPLE 1

A magnetic paint composition having the following composition is prepared:

|  | Parts |
|---|---|
| $\gamma$-Fe$_2$O$_3$ magnetic particles (particle size, about 0.3 $\mu$; axis ratio, about 8) | 68 |
| VAGH (hydroxyl group-containing vinyl chloride-vinyl acetate copolymer; manufactured by Union Carbide Corporation | 26 |
| N 1432J (acrylonitrile-butadiene copolymer; manufactured by Nippon Zeon Co., Ltd.) | 5 |
| Coronate L (polyisocyanate; manufactured by Nippon Polyurethane Co., Ltd.) | 2 |
| Carbon black | 7 |
| $\alpha$-Iron oxide particles (granular form; average particle size, 1 $\mu$) | 1.5 |
| Methyl isobutyl ketone | 75 |
| Toluene | 75 |

This paint composition is applied to the both surfaces of a polyester base film to form a magnetic layer having a thickness of about 2–5$\mu$ on dryness. To the thus formed magnetic layer, a solution comprising a lubricating agent shown in Table 1 (30 parts) and n-hexane (1000 parts) is applied, and after drying, the film is cut into a disk form to prepare a magnetic disk.

TABLE 1

| Run No. | Lubricating agent | Melting point or flowing point (°C.) |
|---|---|---|
| 1 | Liquid paraffin | About −20 |
| 2 | Squalane | About −60 |
| 3 | α-Olefin polymerized oil | About −40 |
| 4 | Silicone oil | |

COMPARATIVE EXAMPLE 1

The preparation of the magnetic disk is carried out in the same manner as in Run No. 1 in Example 1 but omitting the application of a solution of liquid paraffin in n-hexane.

COMPARATIVE EXAMPLE 2

The preparation of the magnetic disk is carried out in the same manner as in Run No. 1 in Example 1 but omitting the incorporation of α-iron oxide particles into the magnetic paint composition.

The magnetic disks obtained in Example 1 and Comparative Examples 1 and 2 are each placed into a jacket and inserted into a recording-generating apparatus. The contact between the magnetic disk and the magnetic head (pad pressure, 40 g/cm$^2$) is effected at a rate of about 1 m/sec at 20° C. under a relative humidity of 60%. The running of the apparatus is continued until the number of accumulated drop out amounts to 500, and the time required therefor is determined.

Then, the magnetic head is replaced by a brass dummy head, and after running for about 10 hours, the amount of wear of the head is determined.

The results are shown in Table 2.

TABLE 2

| Example | Running time (hrs) | Amount of wear of magnetic head (μ) |
|---|---|---|
| Example 1 (Run No. 1) | 280 | 0.5 |
| Example 1 (Run No. 2) | 270 | 0.8 |
| Example 1 (Run No. 3) | 260 | 0.8 |
| Example 1 (Run No. 4) | 110 | 5.0 |
| Comparative Example 1 | 50 | 20 |
| Comparative Example 2 | 80 | 0.5 |

It is apparent from the above table that, in the magnetic disks obtained by the combined use of α-iron oxide particles and a liquid hydrocarbon such as liquid paraffin (Example 1), the amount of the wear of the magnetic head is approximately in the same degree or extremely reduced in comparison with the disks obtained by the sole use of α-iron oxide (Comparative Example 1) or of liquid paraffin (Comparative Example 2), and besides the durability is markedly improved. Further, the disks obtained by the combined use of α-iron oxide particles and a liquid hydrocarbon are superior in the wear-resistance of the magnetic head and the durability also in comparison with the disks obtained by the combined use of α-iron oxide particles and any other liquid lubricating agent.

EXAMPLE 2

A magnetic paint composition having the following composition is prepared:

| | Parts |
|---|---|
| γ-Fe$_2$O$_3$ magnetic particles | 68 |
| VAGH | 26 |
| N 1423J | 5 |
| Coronate L | 2 |
| Carbon black | 7 |
| Methyl isobutyl ketone | 75 |
| Toluene | 75 |

This paint composition is applied to the both surfaces of a polyester base film and dried to form a magnetic layer of 2–5μ in thickness, and a solution for impregnation having the following composition is applied thereto:

| | Parts |
|---|---|
| Liquid paraffin | 50 to 20 |
| Stearic acid | 10 to 0.5 |
| n-Hexane | 1000 | the proportion of liquid paraffin and stearic acid being as shown in Table 3.

TABLE 3

| Run No. | Liquid paraffin (% by weight) | Stearic acid (% by weight) |
|---|---|---|
| 1 | 95 | 5 |
| 2 | 90 | 10 |
| 3 | 80 | 20 |

After drying, the film is cut into a disk form, whereby a magnetic disk is obtained.

COMPARATIVE EXAMPLE 3

The preparation of the magnetic disk is carried out in the same manner as in Example 2 but using as the solution for impregnation a solution comprising liquid paraffin (30 parts) and n-hexane (1000 parts).

COMPARATIVE EXAMPLE 4

The preparation of the magnetic disk is carried out in the same manner as in Example 2 but using as the solution for impregnation a solution comprising stearic acid (30 parts) and n-hexane (1000 parts).

COMPARATIVE EXAMPLE 5

The preparation of the magnetic disk is carried out in the same manner as in Example 2 but using as the solution for impregnation a solution comprising liquid paraffin (15 parts), lauric acid (15 parts) and n-hexane (1000 parts).

The magnetic disks obtained in Example 2 and Comparative Examples 3, 4 and 5 are each placed into a jacket and inserted into a recording-generating apparatus. The contact between the magnetic disk and the magnetic head (pad pressure, 40 g/cm$^2$) is effected at a rate of about 1 m/sec at 20° C. under a relative humidity of 60%. The running of the apparatus is continued until the number of accumulated drop out amounts to 500, and the time required therefor is determined. The results are shown in Table 4.

TABLE 4

| Example | Running time (hrs) |
|---|---|
| Example 2 (Run No. 1) | 200 |
| Example 2 (Run No. 2) | 250 |
| Example 2 (Run No. 3) | 210 |

TABLE 4-continued

| Example | Running time (hrs) |
| --- | --- |
| Comparative Example 3 | 80 |
| Comparative Example 4 | 30 |
| Comparative Example 5 | 100 |

It is apparent from the above table that all of the disks obtained by the combined use of liquid paraffin and a higher fatty acid having a melting point of 45° C. or higher as the lubricating agent (Example 2) are greatly improved in the durability in comparison with the disks obtained by the sole use of liquid paraffin or stearic acid (Comparative Examples 3 and 4) and by the combined use of liquid paraffin and a higher fatty acid having a melting point of 45° C. or lower (Comparative Example 5).

EXAMPLE 3

A magnetic paint composition having the following composition is prepared:

| | Parts |
| --- | --- |
| $\gamma$-$Fe_2O_3$ magnetic particles (particle size, about 0.3 $\mu$; axis ratio, about 8) | 68 |
| VAGH | 26 |
| N 1432J | 5 |
| Coronate L | 2 |
| $\alpha$-Iron oxide particles (granular form; average particle size, 1 $\mu$) | 1.5 |
| Methyl isobutyl ketone | 75 |
| Toluene | 75 |
| Carbon Black | 7 |

The paint composition is applied to the both surfaces of a polyester base film and dried to form a magnetic layer of 2–5$\mu$ in thickness, and a solution comprising a mixture of liquid paraffin and stearic acid in a proportion as shown in Table 5 (15 parts) and n-hexane (500 parts) as the solvent is applied thereto. After drying, the film is cut into a disk form, whereby a magnetic disk is obtained.

TABLE 5

| Run No. | Liquid paraffin (parts) | Stearic acid (parts) |
| --- | --- | --- |
| 1 | 100 | 0 |
| 2 | 99 | 1 |
| 3 | 95 | 5 |
| 4 | 90 | 10 |
| 5 | 80 | 20 |

COMPARATIVE EXAMPLE 6

The preparation of the magnetic disk is carried out in the same manner as in Run No. 1 in Example 3 but omitting the application of a solution of liquid paraffin in n-hexane.

COMPARATIVE EXAMPLE 7

The preparation of the magnetic disk is carried out in the same manner as in Run No. 1 in Example 3 but omitting the addition of $\alpha$-iron oxide particles.

EXAMPLE 4

The preparation of the magnetic disk is carried out in the same manner as in Run No. 3 in Example 3 but changing the particle size, the form and the amount of $\alpha$-iron oxide particles as shown in Table 6 in the preparation of the magnetic paint.

TABLE 6

| Run No. | Form | Particle size ($\mu$) | Amount (parts) |
| --- | --- | --- | --- |
| 1 | Granules | 0.3 | 1.5 |
| 2 | Granules | 0.5 | 1.5 |
| 3 | Granules | 2 | 1.5 |
| 4 | Granules | 3 | 1.5 |
| 5 | Aciculae | 1 | 1.5 |
| 6 | Granules | 1 | 0.15 |
| 7 | Granules | 1 | 0.34 |
| 8 | Granules | 1 | 0.68 |
| 9 | Granules | 1 | 3.4 |
| 10 | Granules | 1 | 5.0 |

The magnetic disks obtained in Examples 3 and 4 and Comparative Examples 6 and 7 are each placed into a jacket shown in FIGS. 1 and 2 of the accompanying drawing and inserted into a recording-generating apparatus. While contacting the magnetic disk with the magnetic head (pad pressure, 40 g/cm$^2$) at a rate of about 1 m/sec at 5° C. under a relative humidity of 50%, the running of the apparatus is continued until the number of accumulated drop out amounts to 500, and the time required therefor is determined.

The present invention will become more fully understood from the accompanying drawings which are given by way of illustration only and thus are not limitative of the present invention.

Figure 1:
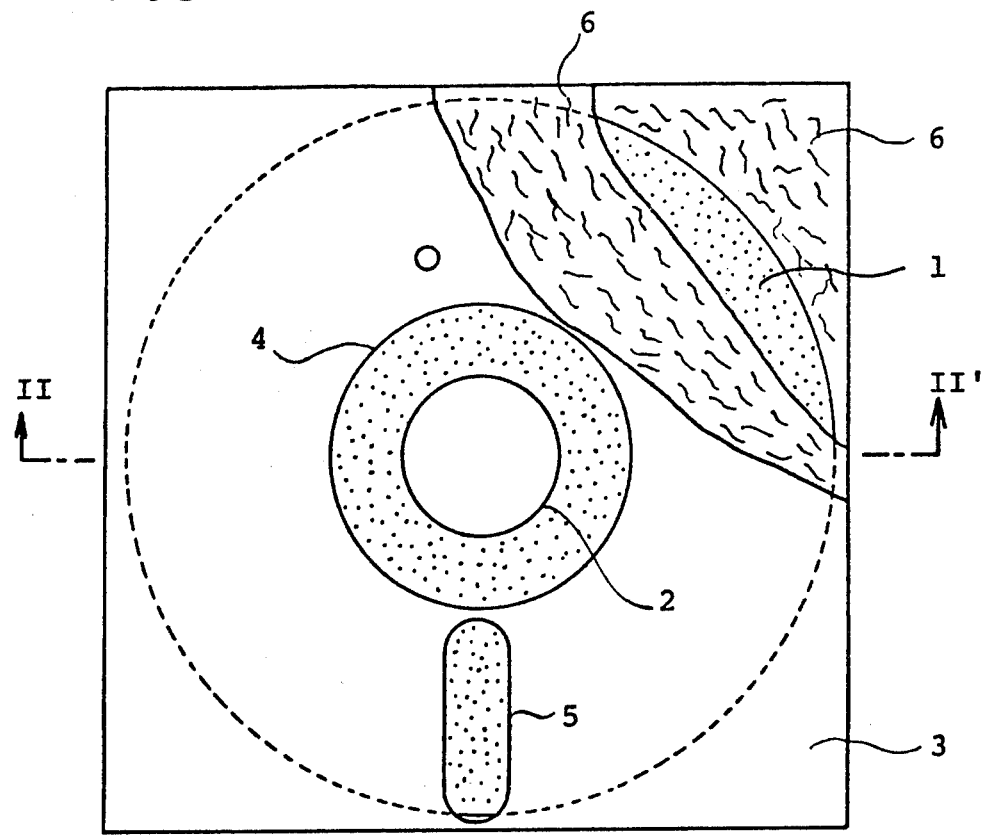
FIG. 1 is a ground plan view of the magnetic disk cartridge of the invention which is partially cut so as to show its structure.
Figure 2:
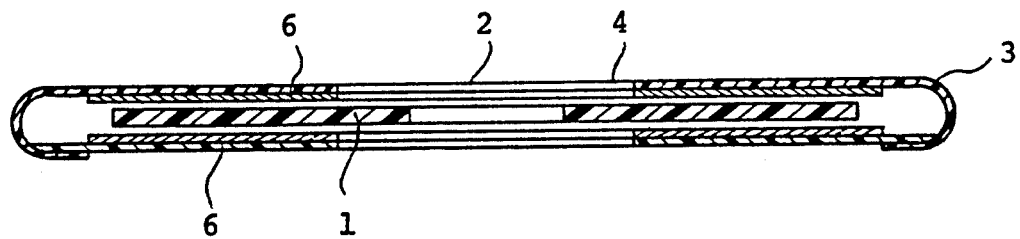
FIG. 2 is a sectional view of the magnetic disk cartridge of FIG. 1 cut by the line II—II'.

In these figures, the numeral 2 indicates a hole for insertion of the driving shaft of the magnetic disk body 1, the numeral 3 is a jacket made of vinyl chloride resin, the numeral 4 is a window for insertion of the driving axis of the jacket 3, the numeral 5 is a window for insertion of the magnetic head and the numeral 6 is a liner comprising non-woven cloth such as rayon fiber or polypropylene fiber, preferably rayon fiber coated by polypropylene in an amount of 2 to 3 parts by weight to 10 parts by weight of the combined amount of them.

Then, the magnetic head is replaced by a brass dummy head, and the amount of wear of the head is determined after running for about 10 hours.

Further, the magnetic disk body is rotated at a rate of about 600 rpm, and the above mentioned non-woven cloth is contacted therewith under pressure of a load of about 125 g at 5° C. for 4 hours under a relative humidity of 50% so as to observe the state of wear of the magnetic layer. The results are shown in Table 7.

TABLE 7

| Example | Running time (hrs) | Amount of wear of magnetic head ($\mu$) | Wear test with non-woven cloth |
| --- | --- | --- | --- |
| Example 3 | | | |
| Run No. 1 | 200 | 0.8 | Contacted surface is worn away |
| Run No. 2 | 250 | 0.5 | Wear are hardly observed |
| Run No. 3 | 250 | 0.5 | Wear are hardly observed |
| Run No. 4 | 200 | 0.5 | Wear are hardly observed |
| Run No. 5 | 150 | 0.5 | Wear are hardly observed |
| Comparative | 50 | 25 | Contacted surface is worn away |

TABLE 7-continued

| Example | Running time (hrs) | Amount of wear of magnetic head (μ) | Wear test with non-woven cloth |
|---|---|---|---|
| Example 6 Comparative Example 7 | 30 | 0.5 | Contacted surface is completely worn away |
| Example 4 | | | |
| Run No. 1 | 80 | 0.5 | Wear are hardly observed |
| Run No. 2 | 180 | 0.5 | Wear are hardly observed |
| Run No. 3 | 280 | 1.0 | Wear are hardly observed |
| Run No. 4 | 350 | 3.5 | Wear are hardly observed |
| Run No. 5 | 90 | 0.8 | Contacted surface is worn away |
| Run No. 6 | 70 | 0.5 | Contacted surface is somewhat worn |
| Run No. 7 | 150 | 0.5 | Wear are hardly observed |
| Run No. 8 | 180 | 0.5 | Wear are hardly observed |
| Run No. 9 | 250 | 1.5 | Wear are hardly observed |
| Run No. 10 | 300 | 4.0 | Wear are hardly observed |

It is apparent from the above table that the magnetic disks obtained in Example 3 have an excellent wear-resistance, showing a long running time, in comparison with the magnetic disks obtained by the sole use of α-iron oxide particles or liquid paraffin. It is also apparent that the magnetic disks obtained by the combined use of α-iron oxide particles, liquid paraffin and stearic acid (Example 3, Run Nos. 2 to 5) are superior in the wear-resistance to the magnetic disk containing no stearic acid (Example 3, Run No. 1), wear being hardly caused in the wear test with non-woven cloth. As understood from the results with Example 4, the running time becomes longer with increase of the particle size or the amount of α-iron oxide particles. An excellent durability is obtained when the particle size is 0.5μ or more or the amount is 0.34 part or more. Further, the granular form is more effective than the acicular form. In case of the particle size being larger than 2μ or the amount being larger than 3.4 parts, the wear of the magnetic head becomes marked, so that it is desirable to limit the particle size and the amount to 2μ or less and to 3.4 parts or less, respectively.

The above mentioned examples illustrate the application of the present invention to magnetic disk cartridges, but this invention is also advantageously applicable to other magnetic recording media such as magnetic tapes and magnetic cards. In case of magnetic disk cartridges, the formation of the magnetic layer may be effected on one surface of the substrate material or on its both surfaces. When formed on the both surfaces, the area of magnetic recording becomes doubled, and besides, the rotation of the magnetic disk body within the jacket can be effected smoothly, which makes it possible to realize excellent magnetic recording and reproducing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium which comprises a substrate and a magnetic layer of about 1.0 to 10μ in thickness comprising magnetic powders and a binder being formed on the substrate, characterized in that the magnetic layer further comprises a liquid hydrocarbon selected from the group consisting of liquid paraffin, squalane, α-olefin and polymerized oil and having a melting or flowing point of about $-20°$ to 60° C. with a higher fatty acid having a melting point of about 45° C. or higher.

2. The magnetic recording medium according to claim 1, wherein the liquid hydrocarbon is liquid paraffin.

3. The magnetic recording medium according to claim 1, wherein the liquid hydrocarbon is used in an amount of about 70 to 99.5% by weight based on the combined weight of the liquid hydrocarbon and the higher fatty acid.

4. The magnetic recording medium according to claim 1, wherein the combined amount of the liquid hydrocarbon and the higher fatty acid is about 0.5 to 50 parts by weight to one part by weight of the magnetic powders.

5. The magnetic recording medium according to claim 1, wherein the magnetic layer further comprises α-iron oxide powders.

6. The magnetic recording medium according to claim 5, wherein the liquid hydrocarbon is liquid paraffin.

7. The magnetic recording medium according to claim 5, wherein the α-iron oxide powders are in a granular form.

8. The magnetic recording medium according to claim 5, wherein the α-iron oxide powders are used in an amount of about 0.5 to 5% by weight of the magnetic powders.

9. The magnetic recording medium according to claim 5, wherein the liquid hydrocarbon is used in an amount of 70 to 99.5% by weight based on the combined weight of the liquid hydrocarbon and the higher fatty acid.

10. The magnetic recording medium according to claim 5, wherein the combined amount of the liquid hydrocarbon and the higher fatty acid is 0.5 to 50 parts by weight to one part by weight of the α-iron oxide powders.

11. The magnetic recording medium according to claim 1, which is formed in a disk form.

12. The magnetic recording medium according to claim 11, which has the magnetic layer on both surfaces of the substrate.

13. A magnetic disk cartridge comprising a jacket and the magnetic disk according to claim 11 contained therein in a state permitting its free rotation.

* * * * *